US012656224B2

(12) United States Patent
Medeiros Junior et al.

(10) Patent No.: US 12,656,224 B2
(45) Date of Patent: Jun. 16, 2026

(54) SYSTEM AND METHOD FOR EVALUATION OF THE DEPOSITION IN TUBES OF THE FURNACES OF A DELAYED COKING UNIT

(71) Applicant: Petróleo Brasileiro S.A.—Petrobras, Rio de Janeiro (BR)

(72) Inventors: Iris Medeiros Junior, Rio de Janeiro (BR); Luiz Andre Guedine Santos, Rio de Janeiro (BR); Marco Antonio Gomes Teixeira, Duque de Caxias (BR); Fernando Garcia Diniz, Rio de Janeiro (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 560 days.

(21) Appl. No.: 18/070,883

(22) Filed: Nov. 29, 2022

(65) Prior Publication Data
US 2023/0168157 A1    Jun. 1, 2023

(30) Foreign Application Priority Data
Nov. 29, 2021    (BR) ...................... 10 2021 023990 5

(51) Int. Cl.
G01M 99/00    (2011.01)
C10B 55/00    (2006.01)
(Continued)

(52) U.S. Cl.
CPC ......... G01M 99/005 (2013.01); C10B 57/045 (2013.01); C10B 57/06 (2013.01);
(Continued)

(58) Field of Classification Search
CPC ....... C10B 55/00; C10B 57/045; C10B 57/06; F27D 21/0014; F27D 2021/0007;
(Continued)

(56) References Cited

U.S. PATENT DOCUMENTS 4,066,532 A  *  1/1978  Garcia ................... C10B 55/00
                                                                    208/50
4,209,490 A  *  6/1980  Duncan .................. C10B 55/00
                                                                    422/240
(Continued)

FOREIGN PATENT DOCUMENTS

BR        112015019327 A2      7/2017
CN          201080471 Y  *    7/2008
(Continued)

OTHER PUBLICATIONS

Translation CN_201080471 (Liang) (Year: 2008).*
(Continued)

*Primary Examiner* — Peter J Macchiarolo
*Assistant Examiner* — Monica S Young
(74) *Attorney, Agent, or Firm* — Morrison & Foerster LLP

(57) ABSTRACT

The present invention addresses to a system and methodology for evaluating the deposition in tubes of the furnaces of delayed coking unit (DCU) in order to reduce the costs involved with premature shutdowns. With this system, load rankings are obtained, influences of certain loads on processing are evaluated, and additives that reduce deposition are further evaluated. Consequently, the results obtained by such a system allow greater flexibility for the follow-up engineer to optimize his delayed coking unit in order to increase load or increase the unit campaign time, drastically reducing costs in premature shutdowns, or increasing its return by increasing load and shutdowns, since the load is limited by the degree of deposit formation, and that directly affects the wall temperature.

12 Claims, 4 Drawing Sheets

(51) Int. Cl.

| | |
|---|---|
| *C10B 57/04* | (2006.01) |
| *C10B 57/06* | (2006.01) |
| *C10G 9/20* | (2006.01) |
| *F27D 21/00* | (2006.01) |
| *G01N 5/00* | (2006.01) |
| *G01N 17/00* | (2006.01) |
| *G01N 25/20* | (2006.01) |

(52) U.S. Cl.
CPC ......... *C10G 9/206* (2013.01); *F27D 21/0014* (2013.01); *G01M 99/00* (2013.01); *G01M 99/002* (2013.01); *G01N 5/00* (2013.01); *G01N 17/008* (2013.01); *G01N 25/20* (2013.01); *C10B 55/00* (2013.01); *C10G 2300/4075* (2013.01); *F27D 2021/0007* (2013.01)

(58) Field of Classification Search
CPC ............. G01M 99/005; G01M 99/002; G01M 99/00; C10G 9/005; C10G 75/00; C10G 2300/4075; G01N 25/20; G01N 17/008; G01N 5/00
USPC .......................................................... 73/865
See application file for complete search history.

(56) References Cited

U.S. PATENT DOCUMENTS

| | | | | |
|---|---|---|---|---|
| 4,910,999 A * | 3/1990 | Eaton | .................... | G01N 17/008 73/61.62 |
| 6,270,656 B1 * | 8/2001 | Gibson | .................... | C10B 55/00 208/50 |
| 8,791,158 B2 * | 7/2014 | Dalton | ................. | A61K 31/277 514/522 |
| 2002/0179494 A1 * | 12/2002 | Doerksen | ................ | C10B 55/00 208/132 |
| 2011/0125423 A1 * | 5/2011 | Allen | ..................... | G01N 25/72 702/47 |
| 2011/0274138 A1 * | 11/2011 | Auret | ................... | G01N 17/008 374/45 |
| 2011/0286492 A1 * | 11/2011 | Auret | ................... | G01N 17/008 374/1 |
| 2022/0228071 A1 * | 7/2022 | Bitting | ..................... | C10G 9/00 |

FOREIGN PATENT DOCUMENTS

| | | | | | |
|---|---|---|---|---|---|
| CN | 101597518 A | * | 12/2009 | | |
| CN | 108279181 A | * | 7/2018 | ............. | G01N 31/10 |
| FR | 2910967 A1 | * | 7/2008 | ......... | G01N 33/0047 |
| KR | 20140085718 A | * | 7/2014 | | |
| WO | WO-0153813 A1 | * | 7/2001 | .......... | G01M 99/002 |

OTHER PUBLICATIONS

Translation CN108279181 (Dong) (Year: 2018).*
Translation KR101423512 (Jung) (Year: 2014).*
Translation WO_0153813 (Alexander) (Year: 2001).*
Translation FR-2910967 (Brothier) (Year: 2008).*
Derakhshesh et al. (Feb. 14, 2013) "Effect of Asphaltene Stability on Fouling at Delayed Coking Process Furnace Conditions", Energy Fuels, 27(4):1856-1864.

* cited by examiner

2mm

SYSTEM AND METHOD FOR EVALUATION OF THE DEPOSITION IN TUBES OF THE FURNACES OF A DELAYED COKING UNIT

CROSS-REFERENCE TO RELATED APPLICATION

This application claims priority to Brazilian Application No. 10 2021 023990 5, filed on Nov. 29, 2021, and entitled "SYSTEM AND METHOD FOR EVALUATION OF THE DEPOSITION IN TUBES OF THE FURNACES OF A DELAYED COKING UNIT," the disclosure of which is incorporated herein by reference in its entirety.

FIELD OF THE INVENTION

The present invention addresses to a system and laboratory method for evaluating the deposition in tubes of furnaces of a delayed coking unit (DCU) with application in refineries containing such units, to reduce costs with premature shutdowns due to severe depositions or to allow for increased load on the units.

DESCRIPTION OF THE STATE OF THE ART

It is known that the place with the highest energy consumption of the delayed coking unit (DCU) is the furnace, in which enough heat is generated for the pyrolysis reactions of the heavy compounds present in the feed load to occur, the Vacuum Residue (VR). If any type of refractory material (organic and inorganic) is deposited on the walls of the tubes, it causes significant energy losses.

The reduction in furnace efficiency is due to the need of increasing the thermal load to maintain a constant temperature at the furnace outlet. And not only do energy losses occur, but even more inconvenient disturbances are also generated, such as reduction of furnace campaign time and/or damage to piping, if temperatures exceed the design limits.

The inorganic compounds commonly found in deposits are sodium, iron, silicate, carbonates, among others. They are insoluble in the vacuum residue, but may be suspended depending on the temperature to which the fluid is subjected. With the reduction of viscosity along the furnace tube, this inorganic material tends to approach the tube wall, with the formation of deposits.

The deposition stemming from organic material in the tubes of the furnaces occurs due to the premature conversion of asphaltenic material (precursors) into coke. These materials tend to destabilize during heating due to the disturbance in the system by the increase in temperature, or even by the release of aliphatic hydrocarbons with an increase in temperature, increasing their chance of approaching and stagnating in the tube wall, a region where temperature conditions are more severe favoring conversion into coke.

According to TEIXEIRA, M. A. G.; ZUIM, F. A. (2003) "Determinação de teor de insolúveis em tolueno como indicador do teor de coque em experimentos de pirólise", the carbonaceous materials formed in furnaces, and which result in interruption of campaigns for decarbonization of furnaces, which are normally found adhered to the walls, have already suffered enough thermal stress to have characteristics similar to those of the final pyrolysis product that is obtained as coke in the delayed coking process, although they tend to be even richer in carbon.

Part of this material can detach from the tube wall, due to physical effects (the very turbulence promoted by the formation of light compounds or the flow), and can return to the middle of the fluid, and with that it is carried to the drums of reaction. This dynamic is desired, but part of it permanently adheres to the tube wall, becoming a refractory, resulting in well-known problems for those who operate the unit. The main one is the reduction of the campaign time, because the thermal exchange is reduced and this forces the operation to compensate the thermal load of the unit to maintain the fluid outlet temperature. But there is a temperature limit of the designed resistance of the equipment, which fatally forces the unit to shut down for cleaning.

The formation of coke in heating systems occurs because asphaltenes have a tendency to adsorb on the heated surfaces of the piping due to their polar characteristic, and this is increased when the oil mixtures approach the concentrations of greater instability, favoring a greater occurrence of precipitation of asphaltenes, and consequently its conversion into coke.

The deposition problem in thermal systems intensifies with the processing of heavier oils. However, among the variables already mentioned, numerous others interfere with the speed of deposition in the furnace tubes. Several of them are undoubtedly related to the quality of the fluid, although it is not known exactly which compositional parameters determine the effect.

In addition, other variables are known to have a great or decisive influence, such as fluid speed, flow regime, tube roughness and geometry, tube cleaning history (tube age, employed decoking technique), heating rates, heat flow, process variables (such as pressure and temperature) and their gradients.

Thus, it becomes difficult to obtain data from industrial equipment, not only because of the difficulty in properly measuring all these parameters, but also because of their variability in the field.

In recent years, the need of processing bottom-of-barrel loads has been growing, as it greatly increases the profitability of the refinery and with that many problems related to the presence of asphaltenes, such as the deactivation of catalysts, the formation of coke in thermal systems and undue deposition (fouling) increased proportionally to the processing of these loads. The formation of coke occurs because asphaltenes have a tendency to adsorb on the heated surfaces of the piping, and this is increased when the oil mixtures approach the concentrations of greater instability, favoring a greater occurrence of asphaltene precipitation.

In the literature there are equipment such as autoclaves, in which the vacuum residue is subjected to temperature conditions below those applied to delayed coking units, and its fluid dynamics is incompatible with the units, since in these pieces of equipment the fluids are constantly circulated around the resistance, and are not passed through a heated concentric tube. In this condition, it is not possible to maintain the outlet temperatures of the coke unit because it would convert the feed completely into liquids and coke. Therefore, there is no equipment that simulates the conditions of the coke furnace and that in a single test evaluates the effects of bulk temperature (middle of the fluid), skin point (wall), cooling for the cessation of reactions and with fluid dynamics similar to what happens in furnace tubes. Cooling is important to stop the conversion reactions, which allows generating only the deposition of interest in the test (DERAKHSHESH, M. et al. "Effect of Asphaltene Stability on Fouling at Delayed Coking Process Furnace Conditions", Energy & Fuels, v. 27, p. 1856-1864, 2013).

Document U.S. Pat. No. 4,910,999A refers to a laboratory device that produces a scale deposit, under controlled temperature and pressure, which reproduces the actual conditions of the plant and accurately measures the scale deposit accumulated during the deposition process. The device is used to test the scaling tendencies of a wide variety of fluids that change in contact with a hotter surface, forming solid or semi-solid deposits that adhere to the surface, wherein the device includes multiple probes, each removably supporting test wires that are electrically heated to selected temperatures for multiple simultaneous scaling tests by a constant heat flow or at a constant temperature.

Document BR112015019327A2 discloses improved catalytic reactions in a coking process, wherein heavy gas oil components, material for recycling from the coking process and heavier hydrocarbons in the delayed coking process are cracked in the coking vessel by injecting a catalytic additive in the vapors above the gas/liquid-solid interface in the coke drum during the coking cycle. The additive may comprise cracking catalyst(s) and cooling agent(s), alone or in combination with the propagating agent(s), excess reagent(s), carrier fluid(s) or any combination thereof to modify the reaction kinetics to preferentially crack these components. The cooling effect of the additive can be effectively utilized to condense the compounds with higher boiling points from traditional recycling onto the catalyst(s), thus focusing on the catalyst exposure to these target reagents.

The work of EATON, P.; GRAY, M. "Refinery furnace fouling", 2008 AIChE Spring National Meeting, discloses a laboratory apparatus that simulates a furnace operating in scaling mode. The apparatus is designed to simulate a heat exchanger or furnace tube surface exposed to a refinery flow. The probe surface and bulk fluid temperature can be set to match the condition of the refinery process and thus generate a scale deposit in a similar manner. The level of confidence is further enhanced by the fact that the apparatus includes several probes, each exposed to the same fluid for simultaneous scaling tests, which are mounted symmetrically around and spaced an equal distance apart from a cylinder, which rotation produces the same probe speed on each scaling surface. The entire rotating cylinder and probe arrangement is located inside an autoclave.

In view of this, no document of the state of the art discloses a system and method for evaluating the deposition in tubes of the furnaces of a delayed coking unit such as that of the present invention.

Thus, in searching for a better understanding of the phenomenon of precipitation of chemical species to create a load composition that minimizes the formation of scaling and maximizes the processing of heavy oils and with the aim of solving such problems, the present invention, through a laboratory system in which temperature conditions are simulated and a fluid dynamics closer to the reality of DCUs is used. With this system, load rankings are obtained, influences of certain loads on processing are evaluated, and additives that inhibit deposition are further evaluated. The result of this is greater flexibility for the follow-up engineer to optimally allocate his loads and then reduce the deposition in the tubes of the furnaces of the delayed coking units (DCUs), increasing the campaign time or increasing the load, significantly increasing the profitability of the units.

In this way, the invention allows the propensity of each fluid to form deposits in the delayed coking units (DCU) to be obtained by laboratory test, which allows it to optimize its units in order to increase load or increase the unit campaign time, drastically reducing costs in premature shutdowns, or increasing its return by increasing load and shutdowns, since the load is limited by the degree of formation of deposits, and which directly affects the wall temperature.

BRIEF DESCRIPTION OF THE INVENTION

The present invention addresses to a system and a method for evaluating the deposition in tubes of furnaces of a delayed coking unit applied in laboratory research in which they are used in the optimization of refineries that contain delayed coking units in their refining schemes.

Such a system comprises load vessels, piston pump, 3 furnaces, cooling section of the last furnace, nitrogen blowing in the load vessels, temperature gauges in the load vessels, mechanical stirrer in the load vessel, temperature gauge before the pump, temperature gauge at the inlet of the first furnace, temperature gauge in the middle of the furnaces glued to the reaction sections, stainless steel tubes in the three furnaces (reaction section), pressure controllers at the furnace inlet, between the same and at the outlet.

BRIEF DESCRIPTION OF THE DRAWINGS

The present invention will be described in more detail below, with reference to the attached figures which, in a schematic way and not limiting the inventive scope, represent examples of its embodiment. In the drawings, there are.

DETAILED DESCRIPTION OF THE INVENTION

The system of the present invention is intended for the analysis of vacuum distillation residues through the formation of coke on the walls of heated tubes. By exposing the vacuum distillation residue to temperatures above the coking temperature, the process of forming a layer of coke on the walls of the tubes is accelerated. By analyzing the amount of coke formed in the reaction tubes and in the middle of the fluid, the propensity of a given load to form a deposit under refining operating conditions on the walls of the tubes of the delayed coking units is determined.

Figure 1:
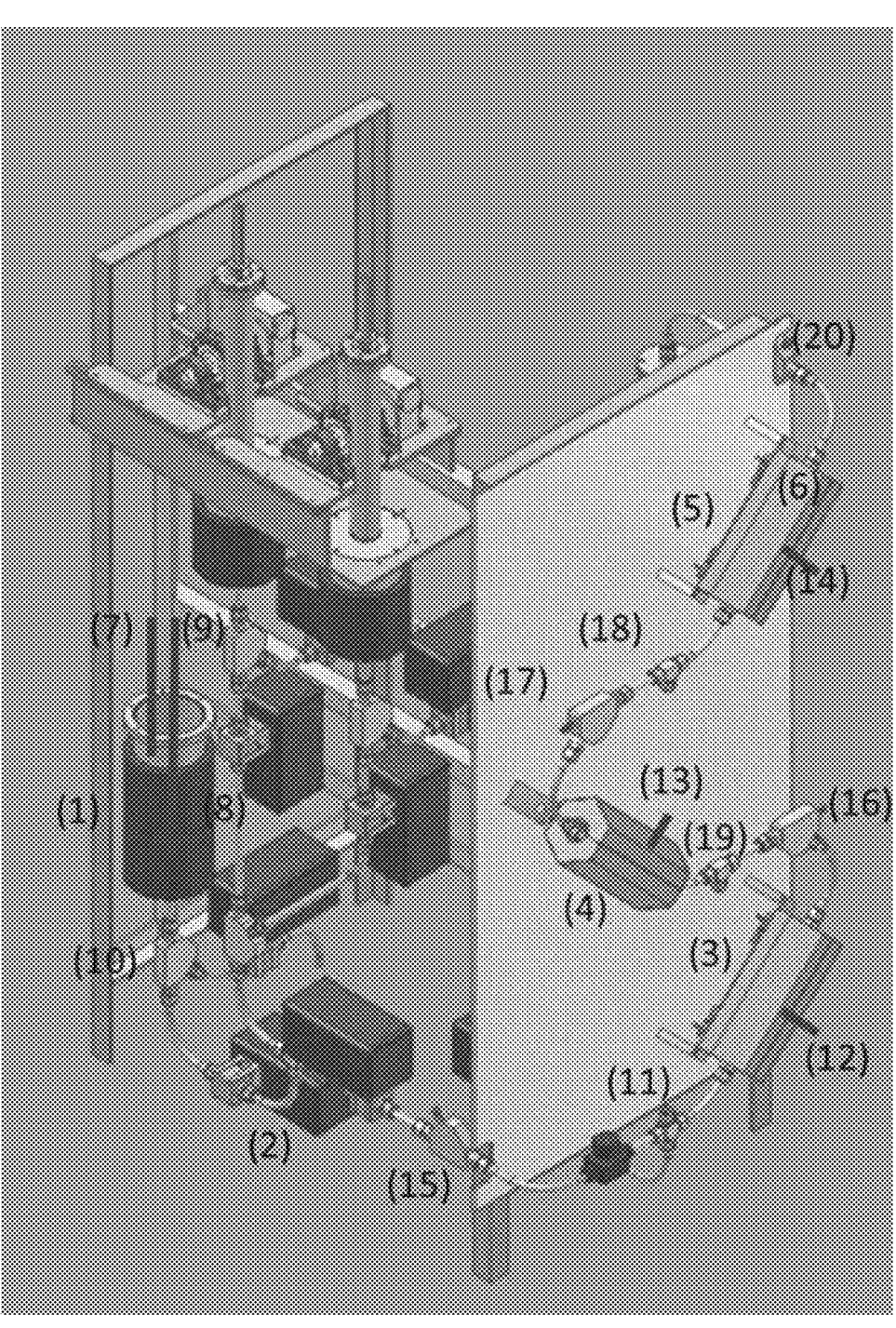
FIG. 1 illustrating the system of the present invention in 3D visualization of the bench apparatus for evaluating the formation of deposits in delayed coking furnaces.

Therefore, the system for evaluating the deposition in tubes of the furnaces of a delayed coking unit according to the present invention and illustrated in FIG. 1 comprises a load vessel (1), piston pump (2), 3 furnaces (3, 4 and 5), cooling section of the last furnace (6), nitrogen blowing in the load vessels (7), temperature gauges in the load vessels (8), mechanical stirrer in the load vessel (9), temperature gauge before the pump (10), temperature gauge at the inlet of the first furnace (15) and between the furnaces (16, 17) and at the outlet of the third furnace (20), temperature gauge in the middle of the furnaces glued to the reaction sections (12, 13 and 14), stainless steel tubes in the three furnaces (section of reaction not visible inside furnaces 3, 4 and 5), pressure controllers at the inlet of the furnaces between them and at the outlet (11, 19 and 18).

The system consists of three gradual heating sections (400° C., 500° C. and 600° C., the latter being able to reach 700° C.), wherein a certain amount of deposit formed by the vacuum residue sample or other residue of interest will be pumped by the heating battery until the observation of the phenomenon. This phenomenon will be monitored either through the gravimetric measurement of the formed coke (removing the scaled tube or measuring the dispersed coke in the middle of the fluid), or through the amount of energy necessary to keep the fluid outlet temperature constant, or through the pressure differential. At the end of the tests, a database containing the classification between loads is made available.

The objective of the three sections is to reach a temperature of 400° C. in the first furnace (3) (furnace 1), the temperature at which the pyrolysis reactions are initiated, in the second furnace (4) (furnace 2) to reach 500° C., temperature where the fluid in the DCU leaves the furnace to the drums, which can go up to close to 600° C., if necessary, and another furnace (5) (furnace 3) that reaches 600° C., which would be the film temperature of the tubes in the furnace. Half of furnace 3, furnace (5), has a cooling system through the circulation of a coolant fluid, with the purpose of inhibiting the continuity of coking reactions outside the reaction sections.

The reaction section tubes used are stainless steel, with ¾" (19.05 mm) in diameter, are removable and the sealing is performed with a special gasket made of graphite and steel. The section tubes are 15 cm long.

The system is controlled by a customized supervisory in LabVIEW.

The pump flow rate is not controlled by the supervisory, but changed manually, and to measure the flow rate, the measurement is made using a valve that is also manual.

As can be seen in FIG. 1, the system consists of a heated sample storage tank with an internal volume of 2.6 liters. The sample is circulated/pumped by a dosing pump at an initial temperature of 380° C., which has a variable flow rate from 0 to 5.8 L/h, through the test sections: three furnaces (3), (4) and (5), which will heat the sample to a temperature of 400° C., 500° C. and between 600° C. and 700° C., respectively. In the last furnace, the sample will be cooled immediately after heating to the initial temperature of 380° C. The purpose of this cooling is to prevent the coking reactions from continuing to occur. Consumable tubes will be used inside the furnaces so that, at the end of the test, they are removed and the deposited material is weighed on an analytical scale, inspected and the formed deposit collected for analysis. The sample will continue through the system until it reaches a pressure reliever, which has an outlet for the gases that form and thus promotes pressure stabilization, in addition to filling with steel wool to reduce foaming/bubbling and a heat exchange system for possible temperature stabilization needs. The liquid obtained can be completely collected or recirculated to intensify the phenomenon. In addition, there is a vessel in parallel with the load vessel for cleaning the system.

Test Procedure in the Load Destabilizing Unit (LDU)

Initially, it is necessary to obtain the mass of the tubes that will be placed in the furnaces. The VR to be used is stored in 3.5 L metal cans, which are also previously weighed to obtain the amount of load discharged into the load vessel. The VR is kept under heating in an oven at 150° C. for at least 12 hours prior to performing the test.

To avoid quenching of the lines and subsequent clogging of the pipe by the VR at the beginning of the test, heavy gas oil (HGO) is previously circulated. At this moment, the furnaces and the load vessel are heated to 220° C. The heating tapes that cover all the pipes and the pump head are also put into operation; this helps in maintaining the temperature of the fluid. The moment chosen to exchange the HGO for VR is when the temperature stabilization in the sensors is observed at a temperature close to or greater than 100° C.

Once the line has been heated, the HGO is removed through the fluid removal valve located at the bottom of the system. After the complete removal of the HGO, the VR which is previously heated to 150° C. is discharged into the load vessel. The can, still containing residual VR, is reserved for weighing after its cooling.

With the VR in circulation, the furnace temperatures are adjusted to the conditions of interest. The VR is maintained in this condition throughout the test.

The pumping flow rate is manually adjusted. In the pump, there is a small display where it is possible to have a notion of the "stroke" (amount of material admitted by the pump piston), which is directly proportional to the flow rate. The measurement is performed by measuring the amount of VR exhausted in a given time. For this to be done, the valve located before the load vessel is opened, the output of the VR is evaluated and then the material is collected during 30 seconds. After that, the flow rate is calculated. This procedure is repeated twice during the test to ensure that there is no variation in flow rate. The measure is necessary because the pump can vary its flow rate depending on the viscosity of the fluid under test.

Auxiliary systems are used, such as: a mechanical stirrer that keeps the VR under stirring in the load vessel, in addition to nitrogen ventilation in the load vessel. The objective is to minimize the entry of air into the reaction system and to avoid possible ignitions, due to the presence of an atmosphere rich in hydrocarbons in the load vessel.

At the end of the test, and after collecting the processed VR, the HGO is again added to the load vessel for cooling the lines and the removal of the residual VR begins.

There was a predilection for the use of HGO because it has a high boiling point (it avoids intense emanations of vapors if a light solvent is used) and, in addition, it is fluid at temperatures just above room temperature, which facilitates its circulation on the equipment. The HGO is then pumped until the equipment temperature drops and approaches 100° C. At this moment, it is removed and then d-limonene or toluene is added for final cleaning of the lines. The procedure is repeated three times and then the test is considered completed.

The tubes used in each furnace are removed, washed with toluene to remove load residue and/or HGO and, after drying, are weighed to verify the amount of material deposited. After obtaining the mass, they are visually inspected.

The processed fluid is subjected to filtration to measure the content of insoluble elements in toluene, and it is considered as coke in suspension.

In summary, the method for evaluating deposition in tubes of the furnaces of a delayed coking unit comprises:

1—Evaluation of leakage with solvent (30 min); In this step, the furnaces are checked for leaks with a solvent.

2—Heating with HGO (45 min); In this step, the heating of the system with heavy gas oil begins.

3—Feeding with pre-heated VR (15 min);

In this step, the vacuum residue preheated in an oven is poured into the load vessel.

4—Heating and beginning of the test (6 h);

The desired heating temperatures for the test are set and the run/test is performed.

5—End of the test—The furnaces are turned off;

In this step, the resistances/furnaces are removed from the operation to start the cooling process.

6—Removal of the VR (15 min);

In this step, the stressed fluid from the run is removed, and by reducing the amount of vacuum residue in the load vessel, heavy gas oil is poured into the load vessel.

7—HGO is circulated until it cools down (1 h);

For cooling and to reduce the emanation of vapors, heavy gas oil is circulated, allowing the system to cool and preventing solidification of the vacuum residue.

8—Removal of the HGO (15 min);

Gas oil is removed from the system.

9—Cleaning with solvent (30 min);

Limonene or toluene is added to the system to completely remove vacuum residue and gas oil.

10—New cleaning with solvent (30 min);

To guarantee complete cleaning, as many solvent circulations as necessary are performed.

11—Removal of tubes and installation of new tubes (30 min). Worn tubes are removed for weighing, inspections and removal of deposited material.

More specifically, the method for evaluating the deposition in tubes of the furnaces of a delayed coking unit is described having the following parts:

a) Insertion of Samples;

The Vacuum Distillation Residue samples depend on high temperatures to be in the liquid state. These temperatures can reach 250° C. For this reason, the reservoirs must be heated to 350° C., guaranteeing the good fluidity of the sample at the moment that precedes the beginning of the analysis. There are two reservoirs, one for cleaning fluid and one for sample.

b) Pumping;

Pumping will take place through a positive displacement pump. This should maintain a constant flow rate controlled by a current signal (4 to 20 mA) and not shear the flow.

c) Heating Furnace System;

The Heating Furnace System consists of 3 (three) furnaces arranged in line (Furnace 1 (furnace (3)), Furnace 2 (furnace (4)) and Furnace 3 (furnace (5)), where each one has a previously adjusted temperature, a temperature gradient from one furnace to the other is obtained, wherein this gradient increases in the same direction as the flow of the sample. The furnaces are split, with the section of the inner tube removable and with heating done through electrical resistance cartridges.

Furnace 3, in particular, consists of two stages. One for heating, followed by one for cooling, each stage being identified as hot part and cold part, respectively.

d) Pressure and Temperature Readings;

The Pressure Readings are only for indication and recording in the supervisory system. The Temperature Readings are both for indication and recording and for control, depending on their role in the process. The temperatures of the furnaces, the tank and the heat exchanger outlet are object of control. The temperatures at the tank outlet, between the furnaces and at the furnace outlet, are only used for indication and recording in the supervisory system.

e) Thermal Exchange System;

The sequence of operation of the thermal exchange system consists of:

Pre-start of the system, raising the temperatures of the furnaces and the supply reservoir to 350° C., thus guaranteeing the fluidity of the sample;

Filling the sample reservoir with at least 1 liter;

After stabilizing the temperatures, the process starts at the command of the operator (from this moment on, the process takes place automatically);

At the end of the coking process, the cleaning process begins using oils (probably toluene) specified by the operator;

Once cleaned, the tubes are removed from inside the furnaces for analysis.

The cooling system starts in the second half of the last furnace and takes place through coolant fluid (Ethylene glycol) using a specific bath.

Description of the Supervision and Control System

The system instrumentation architecture is concentrated in a PC with Human-Machine Interface developed in Elipse E3 or LabView. The PC must have sufficient analog and discrete inputs and outputs to implement the functions described in the supervision and control philosophy and in the description of the control loops.

The control and/or temperature indication and recording loops use thermocouples as sensor elements and power modules as final control elements. Thermocouple signals are converted into 4 to 20 mA signals by temperature transmitters and sent to the PC to be used in control, indication and records or simply in the indication and records of process variables.

The system flow rate adjustment is defined as a function of the stroke of the pump plunger. This adjustment is made through a 4 to 20 mA signal. This pump has this resource, which allows us to have a flow rate adjustment proportional to the current (4 to 20 mA that controls the stroke of the plunger).

Pressure indications and records are obtained through a sensor element with a 4 to 20 mA transmitter encapsulated in the same equipment.

Functioning of Supervision and Control

The temperature control loops of the furnaces will be executed by the PC, with the necessary analog inputs and outputs resources. The PC will also control the interlocking, generating the respective messages and signals on the HMI.

For temperature control loops, the PC will receive 4 to 20 mA signals from all temperature transmitters and will generate 4 to 20 mA control signals to drive the respective power modules.

The PC will also receive the 4 to 20 mA signal from the pressure transmitters, so that the indication and recording in the supervision system can be performed.

The system is commanded by the operator through the supervision system, which will represent a synoptic form of the system, having all the necessary controls and indicators. The alarms must also be signaled in this system.

The alarms will be visual and audible, the audible ones being silenced by operator intervention in an alarm acknowledgment operation, an event recorded in the history of the execution of the analysis by the supervision system.

Description of Control Loops

There are five control loops, namely:

I. Temperatures of the Sample Insertion and Cleaning Reservoir

The heating of the sample insertion reservoir is done with a thermal tape wrapping the same, powered by a power module. The temperature sensor of this control loop is a thermocouple placed between the thermal tape and the sample insertion reservoir. The control logic is implemented in the PC and the control must operate to keep the reservoir temperature at 350° C.+/−5%.

2. Temperature of Furnace 1

The temperature of Furnace 1 is kept close to 400° C. through an electrical resistance cartridge installed inside the Furnace, powered by a module and the tube in the center of the furnace. The control logic is implemented in the PC.

3. Temperature of Furnace 2

The temperature of Furnace 2 is kept close to 500° C. or at another temperature of interest through an electrical resistance cartridge installed inside the Furnace, powered by a power module, whose temperature sensor is a thermocouple inserted between the wall and the tube in the center of the furnace. The control logic is implemented in the PC.

4. Temperature of the Hot Part of the Furnace 3

The temperature of the Hot Part of Furnace 3 is maintained between 600° C. and 700° C., according to the operator's interest, through an electrical resistance cartridge installed inside the Furnace, powered by a power module, whose temperature sensor is a thermocouple inserted between the wall and the tube in the center of the furnace. The control logic is implemented in the PC.

5. Temperature of the Cold Part of the Furnace 3

The temperature of the Cold Part of Furnace 3 is controlled through a flow rate control loop. The removal of heat takes place through a heat exchanger using coolant liquid (ethylene glycol), previously cooled in a cryostatic bath. The controlled temperature is that of the outlet of Furnace 3, unlike the others, where the controlled temperature is that of the interface between the inside of the furnace and the tube.

Monitoring and Recording of Pressures and Temperatures

The purpose of the pressure and temperature transmitters of this process is to monitor and record such variables, in order to build up a history of each type of sample analyzed.

Safety Interlock

The PC monitors the system variables, generating a visual and audible alarm in the supervisory system, when any of the variables are out of their normal operating ranges. The audible alarms can be silenced by the operator, but the visual ones must remain activated until the variables that originated the same are normalized.

The PC also executes the safety interlocking logics with the respective signals. The interlock turns off the power modules and turns off the pump motor. The events that can cause this interlock are: activation of the emergency button; high temperature at the furnaces or at the sample insertion reservoir; high pressure at the discharge of the furnaces and the pump.

EXAMPLES

The following examples are presented in order to more fully illustrate the nature of the present invention and the way to practice the same, without, however, being considered as limiting its content.

Example 1: Tests with ¼ of the Nominal Pump Flow Rate with VR 8017

The test with vacuum distillation residue (sample VR 8017) was started with HGO for heating the lines. After heating, the HGO was replaced by ~1.2 Kg of VR 8017, heating the furnaces to temperatures of 500° C. (Furnace 1), 650° C. (Furnace 2) and 400° C. (Furnace 3). The temperatures of the middle of the fluid were also monitored about 20 cm after leaving the furnace, remaining at 267° C. (post Furnace 1), 400° C. (post Furnace 2) and 250° C. (post furnace 3), remembering that the latter has a cooling section.

This condition mentioned above was maintained, totaling 6:10 h of running. At this time, the furnaces were turned off and the VR was collected in a metal container; then the HGO was circulated through the equipment until it cooled to 100° C.

At this temperature, the HGO was replaced by the cleaning solvent (limonene). The summary of these conditions is presented in Table 1 below.

TABLE 1

| Test VR 8017 run conditions. | | | |
| --- | --- | --- | --- |
| Start | End | Pump Flow Rate | Temperature (SP) |
| 07:20 h | 08:45 h | Max | 200° C. |
| Running with VR | | | |
| Start | End | Pump Flow Rate | Total Time |
| 08:50 h | 15:00 h | 882 g/h | 06:10 h |
| Furnace 01 (TIC-009) | Furnace 02 (TIC-012) | Furnace 03 (TIC-015) | Load vessel (TIC-001) |
| 500° C. | 630° C. | 400° C. | 250° C. |
| TT-007 | TT-011 Fluid temperature post-furnace 1 | TT-014 Fluid temperature post-furnace 2 | TT-016 Fluid temperature post-furnace 3/ cooling |
| 70.2° C. | 267° C. | 425° C. | 254° C. |

The following day, the furnaces were opened to remove the tubes and measure their masses, M1. The reactors were washed with toluene and, after drying, they were weighed again, M2. The material released during washing was quantified by filtration through a 0.45 $\mu$m PTFE membrane, M3. The results can be evaluated in Table 2.

TABLE 2

| Results of the content of material deposited in the tubes of the equipment. | | | | | |
| --- | --- | --- | --- | --- | --- |
| Tubes | M1 (g) | M2 (g) | M3 (g) | Mtotal (g) | % in relation to the load |
| 1 | 0.0903 | 0.0307 | 0.0186 | 0.0493 | 0.004 |
| 2 | 23.7233 | 19.1723 | 0.458 | 19.6303 | 1.636 |
| 3 | 0.3323 | 0.1343 | 0.0214 | 0.1557 | 0.013 |

M1—Total of post-run aggregated solid containing solvent (g);
M2—Total of solids in the tubes after washing with toluene (g);
M3—Total of solids released during washing (g).

From the result shown in Table 2, it is observed that there was deposition only in Tube 2, and visually the highest concentration of solid present was in the final part of the tube.

The less aggregated solids, which came off during washing, and the deposited materials that were removed from the tubes with a spatula, called intermediates (material deposited in Tube 2 on the inside—face facing the fluid side; and aggregate material deposited in Tube 2—material facing the tube), were sent for evaluation by thermogravimetry to verify if it really was coke, and also to verify the presence of inorganic material.

The results of this run indicate that the unit generates a deposit with a visual appearance of coke.

Example 2: SEM-EDS of the Material Deposited in the VR 8017 Reaction Tube

Figure 2:
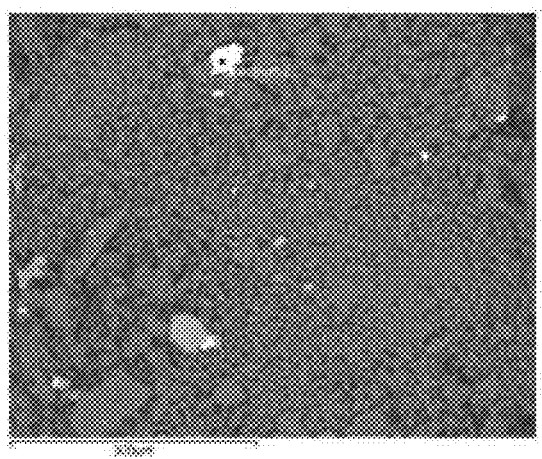
FIG. 2 illustrating an image obtained by SEM-EDS of the solids less aggregated to the wall of the reaction tube.

The sample of the solid less aggregated to the tube wall (test Mar. 29, 2016) was analyzed by SEM-EDS. The image obtained is available in FIG. 2 and its composition is shown in Table 3.

TABLE 3

| Composition by SEM-EDS of solids less aggregated to the tube wall Mar. 29, 2016. | | |
|---|---|---|
| Elements | % (m/m) | % atomic |
| Carbon | 96.619 | 97.819 |
| Oxygen | 2.361 | 1.794 |
| Sulfur | 1.020 | 0.387 |

It is observed by the results presented in Table 3 that the material analyzed is composed mainly of coke ordinary carbon. There is a white spot indicated in FIG. 2, written Spectrum 2, which was analyzed occasionally and the composition found is reported in Table 4.

TABLE 4

| Composition by SEM-EDS of solids less aggregated to the tube wall Mar. 29, 2016 occasionally reported in FIG. 16 as Spectrum 2. | | |
|---|---|---|
| Elements | % (m/m) | % atomic |
| Iron | 42.664 | 16.319 |
| Oxygen | 37.267 | 49.759 |
| Carbon | 18.505 | 32.912 |
| Sulfur | 0.470 | 0.313 |
| Aluminum | 0.388 | 0.307 |
| Phosphorus | 0.384 | 0.265 |
| Manganese | 0.322 | 0.125 |

From the result, it can be mentioned that it is iron oxide. The same was done for the gray area at the bottom of FIG. 2; the compositional result is shown in Table 5.

TABLE 5

| Compositional result of the gray part shown in FIG. 16 of the solids less aggregated to the tube wall Mar. 29, 2016. | | |
|---|---|---|
| Element | % (m/m) | % atomic |
| Oxygen | 51.946 | 68.079 |
| Aluminum | 20.400 | 15.853 |
| Silicon | 2.181 | 1.629 |
| Sulfur | 13.555 | 8.864 |
| Chlorine | 3.363 | 1.989 |
| Calcium | 2.532 | 1.325 |
| Iron | 6.021 | 2.261 |

It is observed by the results of Table 5 that the material is mostly aluminum oxide.

In summary, it is possible to say that the deposited material is coke, and has spots possibly containing iron oxide, which is not necessarily the iron of the load, and may come from the piping. In addition, in another point of the aggregated solids, the presence of aluminum oxide was verified.

Figure 3:
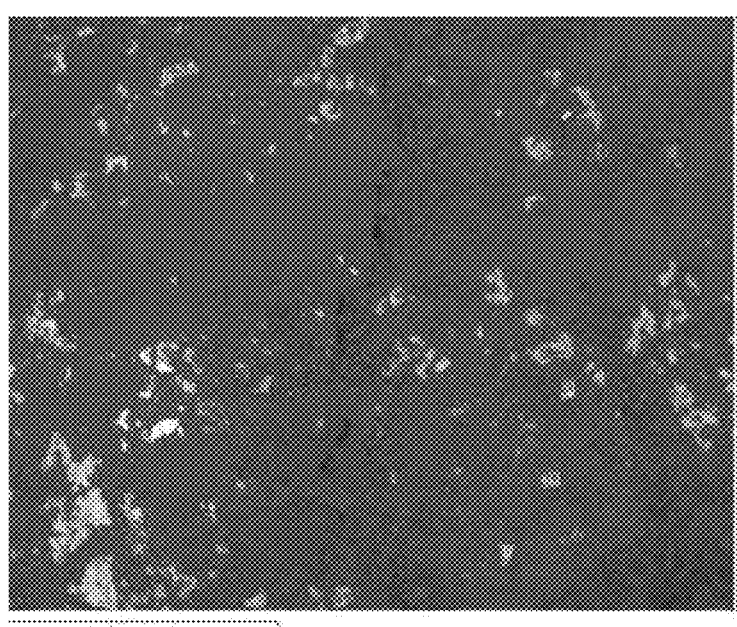
FIG. 3 illustrating an image of the material facing the tube wall.

The sample facing the wall, side adhered to the wall, was also evaluated by SEM-EDS. The image obtained is reported in FIG. 3 and the composition of the dark part is shown in Table 6, the lighter part (gray) is in Table 7 and the even lighter part (white) is in Table 8.

TABLE 6

| Dark color composition found in the material facing the tube wall. | | |
|---|---|---|
| Elements | % (m/m) | % atomic |
| Carbon | 92.496 | 97.041 |
| Oxygen | 1.489 | 1.173 |
| Sulfur | 2.517 | 0.989 |
| Chrome | 0.452 | 0.110 |
| Iron | 3.046 | 0.687 |

TABLE 7

| Lighter color composition (grey) found in the material facing the tube wall. | | |
|---|---|---|
| Elements | % (m/m) | % atomic |
| Carbon | 66.832 | 87.035 |
| Oxygen | 1.721 | 1.683 |
| Sulfur | 11.711 | 5.713 |
| Chromium | 2.395 | 0.720 |
| Manganese | 0.310 | 0.088 |
| Iron | 16.343 | 4.577 |
| Nickel | 0.689 | 0.184 |

TABLE 8

| Lighter color composition (white) found in the material facing the tube wall. | | |
|---|---|---|
| Elements | % (m/m) | % atomic |
| Carbon | 41.844 | 71.111 |
| Oxygen | 3.284 | 4.190 |
| Sulfur | 16.938 | 10.783 |
| Chrome | 2.687 | 1.055 |
| Iron | 34.020 | 12.434 |
| Nickel | 1.226 | 0.426 |

It can be seen from the results presented in Table 6 that the material is mostly coke, the darkest part of the sample, and there is an increase in the concentration of iron and sulfur in the lighter parts, Tables 7 and 8.

Figure 4:
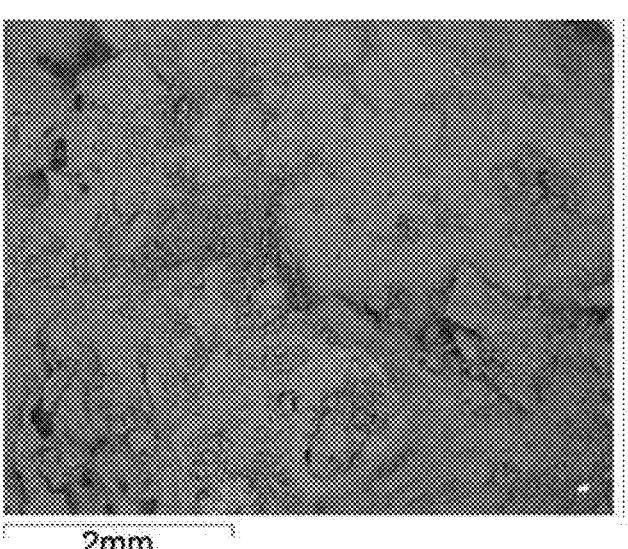
FIG. 4 illustrating an image of the material facing the fluid (internal part) with a less spongy appearance.

The sample facing the fluid, internal part, was also evaluated by SEM-EDS. The image obtained is shown in FIG. 4 and the composition obtained can be evaluated in Table 9.

TABLE 9

| Composition found in the material facing the fluid with less spongy appearance. | | |
|---|---|---|
| Element | % (m/m) | % atomic |
| Carbon | 95.701 | 97.130 |
| Oxygen | 3.238 | 2.467 |
| Sulfur | 1.061 | 0.403 |

Figure 5:
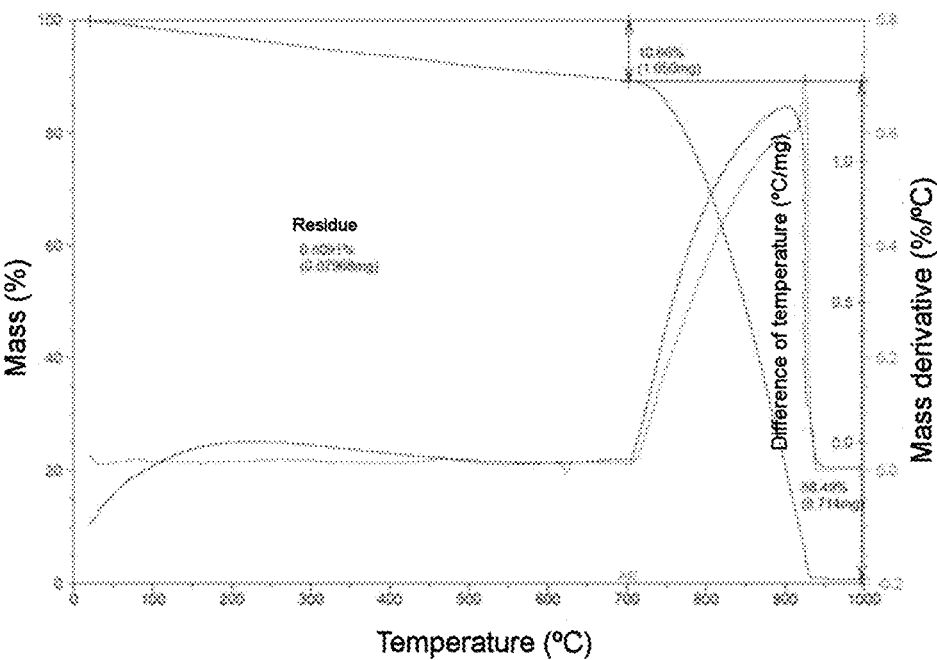
FIG. 5 illustrating TGA of the sample adhered to the wall.

It is observed from the results presented that the material facing the fluid has in its composition mostly carbon. And everything indicates that the material is coke. To confirm these results, this last sample was also evaluated by thermogravimetry (TGA). The obtained thermogram can be evaluated in FIG. 5.

It is observed by the TGA that the sample still has a certain loss of material when it is heated under an inert atmosphere up to 700° C.; however, after reaching this temperature, about 90% of this is lost when air is added, when the material is burned. This result is compatible with coke samples.

From the results presented, it can be affirmed that the system is managing to generate coke in the tubes under the established test conditions.

Example 3: System Repeatability Evaluation (LDU)

To evaluate whether the LDU would be reproducing the results, the VR PP 8176 was subjected to several runs on the equipment, in which all runs were close to 1000 grams per hour. The results obtained are reported in Table 10. For comparison purposes, the content of toluene-insoluble material was measured in the load and the value obtained was 0.03%.

TABLE 10

| Results of repetitions in LDU with VR 8176. | | | | |
|---|---|---|---|---|
| | VR 8176 | | | |
| | Jan. 5, 2017 | Jan. 16, 2017 | May 3, 2017 | May 25, 2017 |
| Flow rate (g/h) | 1087 | 948 | 922 | 911 |
| Insoluble Elements in Toluene - Stressed Load (%) | 0.06 | 0.51 | 0.51 | 0.39 |
| VR amount (g) | 1440 | 1410 | 1131 | 1256 |
| Content of material deposited in the tube (g) | 14.3 | 15.3 | 15.1 | 13.2 |
| Content of material deposited in the tube g/Kg of VR | 9.91 | 10.9 | 13.4 | 10.5 |
| Content of material dispersed in the fluid (g) | 0.49 | 6.78 | 5.37 | 4.46 |
| Total solid material content (pipe + insoluble elements dispersed in the tube) g | 14.8 | 22.1 | 20.5 | 17.6 |

The results shown in Table 10 indicate that the content of material deposited in the tube is repetitive ("Content of material deposited in the tube (g)"), with a standard deviation of 0.98 g. Another evaluation made was to obtain the contents of elements insoluble in toluene in the stressed fluid. With the exception of the first listed sample, the total solids values are in the same order of magnitude.

Figure 6:
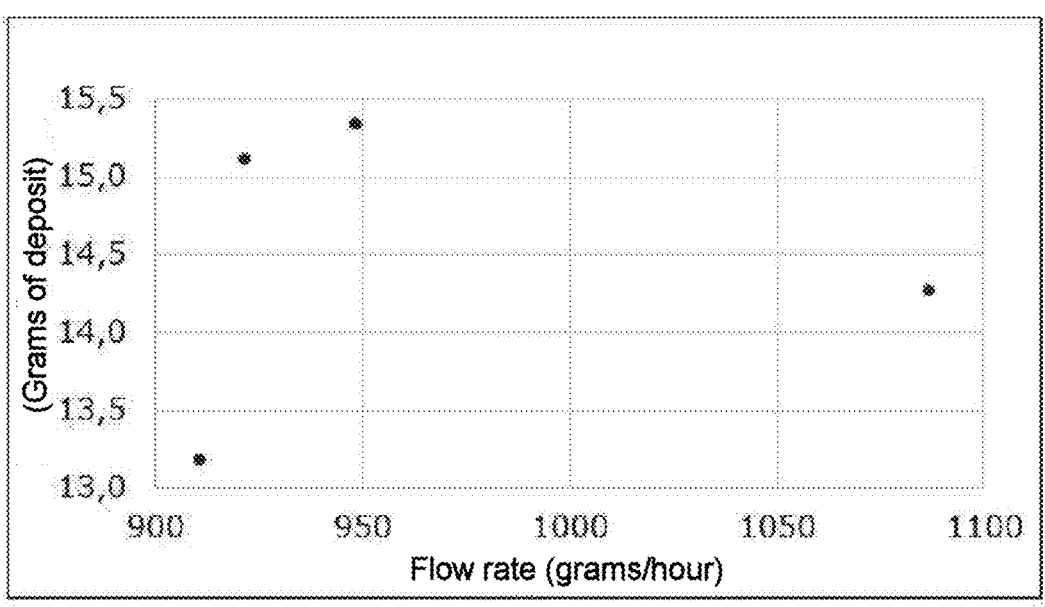
FIG. 6 illustrating a graph of the flow rate vs. coke content in the tube ~1 L/h.

To evaluate whether small variations in flow would linearly interfere with the amount of material formed in the tube, the graph in FIG. 6 was set up, relating the flow rate to the coke content measured in the tube.

It can be seen from the graph that the result does not indicate a direct relation between the amount of deposit in relation to the flow rate, when there is a small variation in the flow rate.

Evaluation of VR 8017 and RASF

The sample of VR 8017 obtained at REVAP and named by the PP as 8017 was submitted to the run at the LDU; the conditions and results obtained can be evaluated in Table 11.

TABLE 11

| Results of LDU runs with VR 8017. | | |
|---|---|---|
| | RUNNING VR 8017 | |
| | Mar. 29, 2016 | Jul. 27, 2016 |
| Flow rate (g/h) | 882 | 828 |
| Toluene-insoluble elements (%) | 0.153 | 0.155 |
| Amount - VR (g) | 1112.5 | 1479.9 |
| Mass of material deposited in the tube (g) | 20.3 | 18.7 |
| Mass of material deposited in the tube g/Kg of VR | 18.3 | 12.6 |
| Mass of material dispersed in the fluid (g) | 1.49 | 2.01 |
| Mass of solid material (tube + insoluble elements) g | 21.8 | 20.7 |

It is observed in Table 11 that the result seems repetitive, there is no significant variation between replicates.

In order to be more confident that the equipment would form deposits in the same proportion as the expected degree of deposit formation for a given load, a RASF was obtained and duplicate runs were performed. The conditions used along with the obtained results are reported in Table 12.

TABLE 12

| Results obtained with RASF. | | |
|---|---|---|
| | RASF | |
| | Jun. 21, 2017 | Jun. 27, 2017 |
| Flow rate (g/h) | 1002 | 990 |
| Toluene-insoluble elements (%) | 5.18 | 3.92 |
| Amount - VR (g) | 1753 | 1460 |
| Mass of material deposited in the tube (g) | 5.38 | 10.97 |
| Mass of material deposited in the tube g/Kg of VR | 3.1 | 7.5 |
| Mass of material dispersed in the stressed fluid (g) | 90.5 | 57.0 |
| Mass of solid material (tube + insoluble elements in the stressed fluid) (g) | 95.9 | 68.0 |
| Mass of solid material (tube + insoluble elements in the stressed fluid) g/Kg of VR | 54.7 | 46.6 |

From the results presented in Table 12, it is observed that the amount of material deposited in the tube was very low, but the amount of coke dispersed in the fluid was very high. There was a great difference between the duplicates and there is still no explanation for what happened because the main influence is the temperature and it was kept constant and equal between the duplicates.

Example 2: Ranking of Runs

Figure 7:
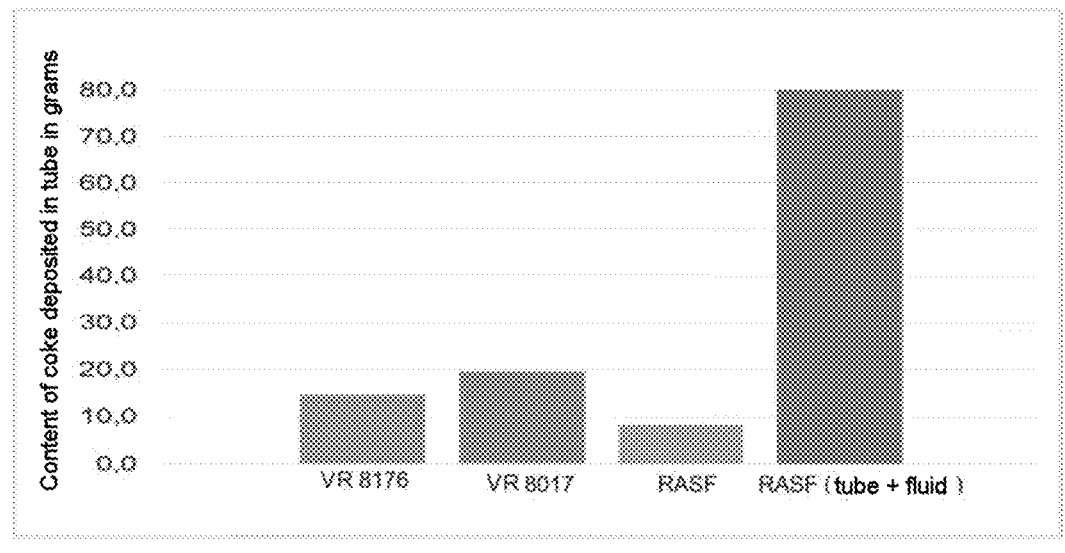
FIG. 7 illustrating a graph of the results of the coke content formed in the tube.

For a better evaluation and comparison of the coke contents formed in the tube, the graph shown in FIG. 7 was set up, with the average results for the evaluated samples.

It can be seen from FIG. 7 that, when comparing only the results of the coke content formed in the tube, the results do not make sense, because the deposit content formed by the RASF was below the others; it was expected that the RASF would form a deposit amount much higher than that formed by VR 8017. However, when including the content of dispersed material formed in the RASF runs, a large amount of coke formed is observed. This relation is consistent with expectations.

With the obtained data, it is considered that the tendency to deposition between the studied samples was: VR 8176<VR 8017<RASF.

Example 3: Methodology for Operating the System

The load is circulated for 6 hours using a quarter of the nominal pumping capacity of the equipment, close to 1 liter per hour, under a temperature of 630° C. in the reaction region, compatible with the order of magnitude of the wall temperature of the DCUs. At flow rates greater than 1.1 liters per hour, a quarter of the pump nominal flow rate, toluene-insoluble material (coke) is formed, which is dispersed in the fluid, but no material deposition occurs in the reaction region.

The samples of VR 8017 and VR 8176, and RASF were tested in this condition and, from the amount of deposited material, the differences between the loads were evaluated. Enough differences were evidenced to obtain a ranking between the samples.

It was observed by the replicas of the VR 8176 that the equipment is repetitive in terms of the amount of material deposited in the tube, with a standard deviation of 1 g.

Statistically, the results between the runs of VR 8176 and VR 8017 are different from each other, with a confidence interval of 95%. Based on this evaluation, it was possible to compare the samples. The comparison showed that VR 8176 has the lowest propensity to form deposits, followed by VR 8017 and finally RASF.

The RASF showed a completely different behavior from the VRs; a more intense deposition was expected because it is a stream richer in coke precursor material, which was not observed in the prototype reaction tube. There was formation of coke, but this was detached and was practically all dispersed in the fluid.

It should be noted that, although the present invention has been described in relation to the attached drawings, it may undergo modifications and adaptations by technicians skilled on the subject, depending on the specific situation, but provided that it is within the inventive scope defined herein.

The invention claimed is:

1. A system for evaluation of deposition in tubes of furnaces of a delayed coking unit, wherein the system comprises:

a jacketed load vessels with a heating system, wherein the load vessel comprises a first temperature gauges and is configured to store a sample;

a piston pump comprising a second temperature gauge at an inlet;

three furnaces arranged in line, wherein a third temperature gauge is coupled at an inlet of a first furnace, a fourth temperature gauges is placed between the first furnaces and a second furnace, and a fifth temperature gauge is placed between the second furnace and a third furnace, wherein each of the three furnaces have another temperature gauges glued in a middle of the furnaces in a reaction section, wherein the piston pump is configured to pump the sample through the three furnaces, the first furnace is configured to heat the sample to a first temperature at which a pyrolysis reaction is initiated, the second furnace is configured to heat the sample to a second temperature greater than the first temperature, the third furnace is configured to heat the sample to a third temperature greater than the second temperature and then subsequently cool the sample, and each of the three furnaces comprises a removable tube for collecting deposit material;

a first pressure controller at the inlet of the first furnace;

a second pressure controller between the first and third furnaces;

an outlet pressure controller at an outlet of one of the three furnaces; and a control and supervision system.

2. The system according to claim 1, wherein the load vessels is heated to 380° C. and has an internal volume of 2.6 liters.

3. The system according to claim 1, wherein the load vessel is for the sample or a cleaning fluid.

4. The system according to claim 1, wherein the three furnaces operate at temperatures of 400° C., 500° C., and 600-700° C.

5. The system according to claim 1, wherein the three furnaces are split, with a section of an inner tube removable and with heating done through electrical resistance cartridges.

6. The system according to claim 1, wherein the third furnace is composed of two stages, one of which is for heating followed by one for cooling.

7. The system according to claim 1, wherein at least some of the temperature gauges are thermocouples whose signals are converted into 4 to 20 mA signals by temperature transmitters and sent to the control and supervision system.

8. The system according to claim 1, wherein at least some of the pressure controllers contain a sensor element with a 4 to 20 mA transmitter.

9. The system according to claim 1, wherein the piston pump has a constant flow rate and is controlled by a current signal.

10. The system according to claim 1, the control and supervision system contains analogue and digital inputs and outputs.

11. A method for evaluation of deposition in tubes of furnaces of a delayed coking unit, wherein the method comprises the following steps:

1) Evaluation of leakage with solvent;

2) Heating of system lines of the system of claim 1, with heavy gas oil (HGO);

3) Feeding with preheated vacuum residue (VR) at a temperature of 150° C.;

4) Gradual heating of the three furnaces, and start of a test, in which a sample is circulated using ¼ of the nominal pumping capacity of the system under a temperature of 630° C.;

5) End of test when the three furnaces are turned off;

6) Removal of the processed VR;

7) HGO is circulated in the load vessel until it cools down;

8) HGO is removed;

9) Cleaning with cleaning solvent;

10) New cleaning with solvent;

11) Removal of tubes in each furnace, washing to remove residue from the sample and/or HGO and, after drying, they are weighed to verify the amount of deposited material; and installation of new tubes in each furnace.

12. The method according to claim 11, wherein the cleaning solvent is limonene or toluene.

* * * * *